April 25, 1967  J. RABINOW  3,315,633
METRIC, ENGLISH CONVERTER FOR MACHINE TOOLS
Filed Oct. 29, 1963  2 Sheets-Sheet 1

INVENTOR
Jacob Rabinow

BY Joseph A. Genovese &
Max L. Libman

ATTORNEYS

April 25, 1967 J. RABINOW 3,315,633
METRIC, ENGLISH CONVERTER FOR MACHINE TOOLS
Filed Oct. 29, 1963 2 Sheets-Sheet 2

INVENTOR
Jacob Rabinow

BY Joseph A. Genovese &
Max L. Libman

ATTORNEYS

United States Patent Office 3,315,633
Patented Apr. 25, 1967

3,315,633
METRIC, ENGLISH CONVERTER
FOR MACHINE TOOLS
Jacob Rabinow, 6920 Selkirk Drive,
Bethesda, Md. 20034
Filed Oct. 29, 1963, Ser. No. 319,771
4 Claims. (Cl. 116—115.5)

This invention relates to machine tools and particularly to a mechanically simple solution to the growing problem of the metric versus English (also called United States and British) units systems as they affect the ease of use of machine tools.

As the interchange of industrial arts, professions and trades increases throughout the world, and there is ever increasing commerce between English-speaking and other countries, a significant portion of engineering and shop work in various countries is in both the English and the metric units systems. Since our machine tools, for the most part, are designed for the English unit system, it is necessary to resort to volumous conversion tables to operate our English-calibrated machines from drawings whose dimensions are in the metric system. An identical problem exists when using a metric machine with drawings having dimensions in the English-unit system.

Although the current practices of either performing mathematical calculations to convert from one system to another, or using conversion tables which are not only volumous but tedious to use, are tolerated, either of the practices is time consuming. Furthermore, conversion tables leave considerable gaps between the successive values presented, thereby necessitating interpolation in order to ascertain intermediate values. And, what is far worse, errors are often introduced by these arithmetic steps.

An object of my invention is to provide a simple, practical conversion mechanism adapted to be connected with a machine tool designed for one units system, by which the machine tool can be directly used for either the machine-designed system units or another units system.

Although the problem of using an English system machine with metric-dimension drawings, or using a metric system machine with English dimension drawings are equally acute, to examplify my invention the following description deals with the problem of using an English-units machine with metric-dimension drawings. My conversion mechanism enables the machinist to directly manually adjust the machine in the metric measurements without regard for conversion tables, mathematical calculations, etc., however, it is understood that my conversion mechanism invention can be equally easily used to solve the converse problem.

Accordingly, consider an existing conventional machine tool having a manual crank, and a dial graduated in fractions of inches. To install my mechanism, the dial and crank are removed and replaced with my conversion mechanism. It consists of a new English units graduated member which is fixed, for instance by being keyed to the machine element (e.g. the lead screw feed), together with a metric system graduated member which is mounted free on and with respect to the same machine element. My conversion mechanism has means by which to directly rotate the element in which case the English unit graduated member will rotate therewith. The same means (preferably embodied as a part of a crank or the equivalent) are selectively engageable with the metric unit graduated member which is freely rotatably mounted on the lead screw element, but which is coupled by gearing to the lead screw element e.g. by way of the English rectly rotate the element in which case the English unit member acts merely as a drive connector between the metric unit member and the lead screw. By selection of the correct ratio of the gear train, metric unit inputs as read on the metric graduated member, impart to the lead screw element angular inputs whose value corresponds to English unit conversions of the metric inputs.

A feature of my invention is that the conversion mechanism can be used colaterally as a substitute for conversion tables in the following way: each time that the lead screw is turned through my conversion mechanism, both the metric and English graduated members are caused to rotate in the correct ratio to each other. For instance, if the English unit member is rotated "1 inch" the metric unit graduated member is rotated "2.54" centemeters which can be read directly from the metric unit member. In other words, my mechanism functions as a disc calculator and can be used as such if, for example, a machinist or other person desires rapid, accurate conversion-table information.

Other objects and features of importance will become apparent in following the description of illustrated forms of the invention which are given by way of example only.

Figure 1:
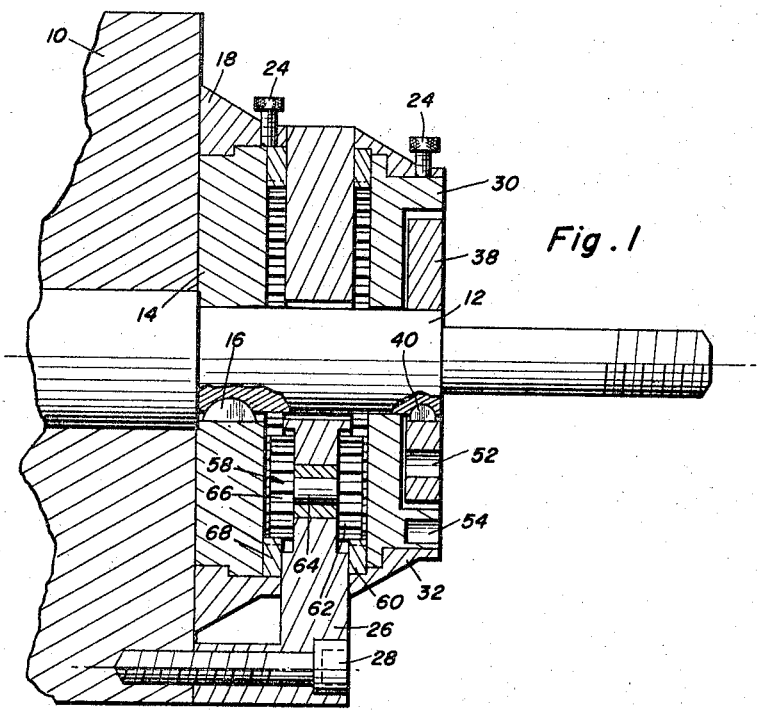
FIGURE 1 is a fragmentary sectional view of a typical, conventional machine tool lead screw mechanism equipped with one of my conversion mechanisms.
Figure 3:
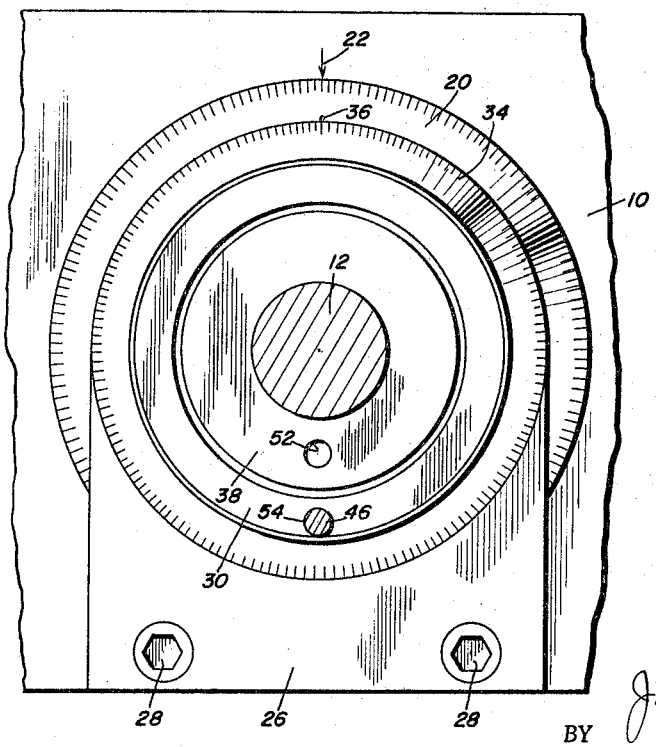
FIGURE 3 is a sectional view taken on the line 3—3 of FIGURE 2.
Figure 2:
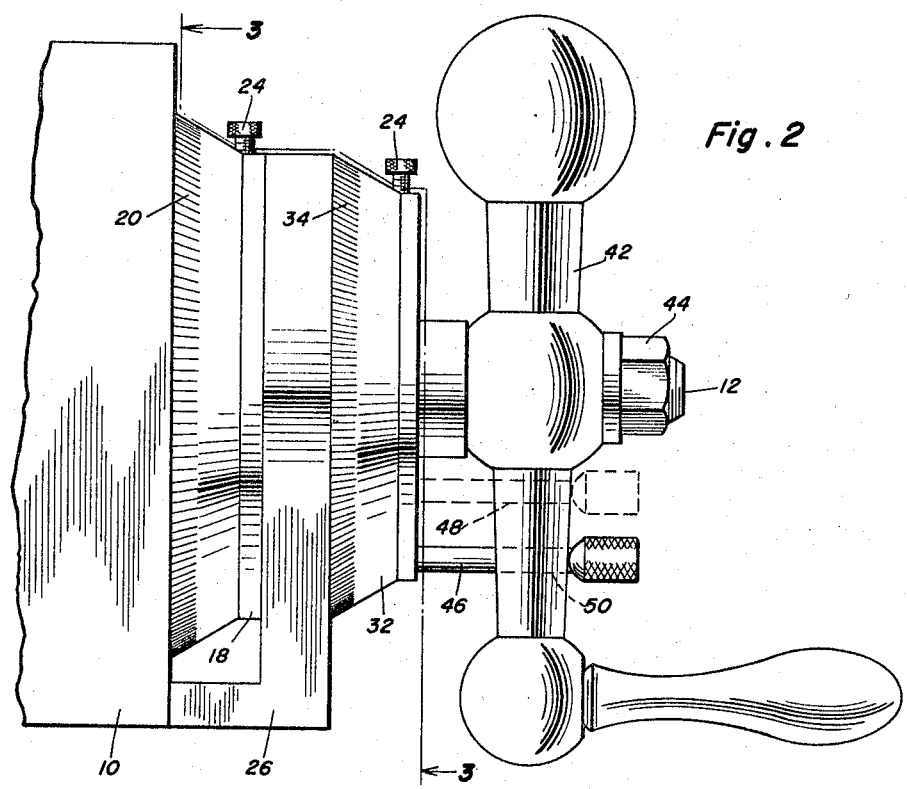
FIGURE 2 is a side elevational view of the mechanism in FIGURE 1, showing it fully installed on the machine tool.

FIGURES 1–3 show a part of a machine tool 10 equipped with a rotatable element 12, for instance, a shaft of the lead screw of the machine tool. As suggested previously, my conversion mechanism is equally suited to convert an existing machine of the English unit system, for direct metric input or a machine of metric unit system for direct English unit input. However, in the interest of brevity, it is assumed that machine tool 10 is designed as most American machines i.e. for English units.

My conversion mechanism can be designed as a single device to be attached to conventional shaft element 12, or it can be provided as a set of several parts to be installed on element 12. The latter alternative is illustrated (FIGURE 1). My conversion mechanism consist of a first member 14 in the form of a disc which fits over element 12 and is keyed (or otherwise fixed) thereto as at 16. Member 14 can have graduations on the periphery thereof, (not shown) or can be provided with a separate ring 18 having English unit graduations 20 (FIGURE 2) thereon to be read in conjunction with datum mark 22 (FIGURE 3). The ring 18 is preferred because the "0" position can be selected by the machinists and fixed by means of set screw 24 in accordance with usual machine operation practice.

Support 26 is secured to the body of machine 10, for instance by bolts 28, and is located between member 14 and the metric member 30. The metric member like the English member 14, is preferably equipped with a ring 32 (plus a set screw 24) with metric graduations 34 (FIGURE 2) to be read in conjunction with datum mark 36 (FIGURE 3) connected with support 26. While English member 14 is keyed to element 12, metric member 30 is freely rotatable with respect to element 12 by having a central bore through which element 12 extends (FIGURE 1).

The front face of member 30 is recessed (FIGURE 1) to accommodate collar 38 which is keyed as at 40 (or otherwise fixed) to element 12. The final parts of the assembly are handle 42 (or the equivalent) freely rotatable on shaft 12, a fastener as nut 44 (FIGURE 2) on the threaded end of element 12, and a mode selection pin 46 which is passed through one of two apertures 48 or 50 in handle 42 and engageable in selected holes 52 or 54 (FIGURE 1) in collar 38 and metric member 30 respectively.

When mode selection pin 46 is inserted in apertures 48 and 52, rotation crank 42 will be imparted directly to element 12 by means of collar 38, key 40 and the keyway occupied by the key. Since member 12 (and its graduated ring 18) are keyed to element 12, the direct reading of the English units graduations 20 are apparent. Thus, when the machine tool is used as originally designed (entirely with English unit inputs) my conversion mechanism has no direct effect.

Now assume that the machinist desires to operate the machine 10 with inputs in metric units. Pin 46 is placed in apertures 50 and 54 so that when the crank 42 is rotated member 30 is rotated by the pin 46. Since member 30 is not physically secured to element 12, rotation of member 30 is transmitted to member 14 by way of gearing 58 having the desired metric-to-English conversion ratio. Gear train 58 consists of an internal ring gear 60 having one hundred and twenty five teeth. Pinion 62 adjacent to one face of support 26, engages the internal teeth of ring gear 60 and is fixed to a lay shaft 54 mounted in a bearing in support 26. An identical pinion 66 is attached to shaft 64 and is located on the opposite face of support 26 to engage the teeth of internal ring gear 68 having one hundred and twenty seven teeth. One of the ring gears can be standard while the other is a bastard gear.

From the above it can be seen that the ratio of the two gears 60 and 68, and hence of the two dials is very nearly 1:1. This was done for the sake of simplicity of mechanism and the calculations were performed as follows: if the "English" dial is graduated so that a full revolution will produce a table motion of the machine tool of .200" and if the corresponding metric dial is graduated so that a full revolution will produce a table motion of the machine tool of 5 mm. it follows that the ratio of the two will be:

.2 × 2.54 = .508 cm.
5 mm. = .500 cm.
508/500 = 127/125

Figure 4:
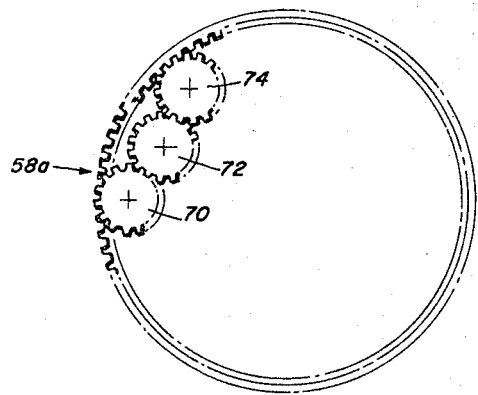
FIGURE 4 is a schematic view showing a modification of the gear train used in my conversion mechanism.

While the gear train 58 shown in FIGURE 1 uses one standard and one off-standard internal gear, it is also possible to obtain the 127:125 gear ratio with an entirely standard gear train 58a as is shown in FIGURE 4. Here a standard set of identical pinions 70, 72, and 74 connect the two internal gears of 125 and 127 teeth, respectively, and at the same time preserve the identical sense of rotation as in the gear train 58.

In those cases where the relationship between the English and metric dials is chosen to be not approximately 1:1, as in the previous illustrations, the gear train will involve a different gear ratio but the principle will remain as before. For example, pinions 70 and 74 need not have identical number of teeth.

The two ring gears 60 and 68 (FIGURE 1) are secured to the respective members 30 and 14. Accordingly, when member 30 is rotated, the metric inputs can be read directly by graduations 34. Rotation of the metric member 30 is imparted to member 14 by means of the reducing gear train 58 whereby the angular motion of member 14 is imparted to machine element 12 by means of key 16. Therefore, the machine element 12 experiences the precise angular input imparted on a metric unit basis as though the machinist had turned a dial attached to a metric screw built into the machine tool.

As mentioned before, my conversion mechanism can be used as a dial calculator because both members 30 and 14 (plus their rings 32 and 18 respectively) rotate in the correct conversion proportion to each other regardless of whether the actual input is through the metric or English unit setting of my mode selection pin 46.

My mechanism can very easily service a metric unit system machine tool. For example, if machine tool 10 were designed as a metric unit machine, for the conversion device to be used therewith, dials 18 and 32 and gears 60 and 68 are exchanged, i.e. they will occupy one another's position.

While my invention is described in connection with a 10 pitch lead screw and a direct dial that, therefore, turns one revolution for one-tenth inch motion, and a metric dial that turns one revolution for 5 mm. motion, it is understood that by using different gear couplings between the dials I can provide similar results for other lead screws or controls, and I can provide dials with any reasonable number of graduations.

The question of backlash always presents itself in machine tools and accessories therefor. Although I have introduced an additional gear train, the backlash of simple, good gears is very small in comparison to that of the lead screw, and it simply adds to it. Furthermore, the effect of the backlash is always removed by a competent machinist by the usual practice of always advancing the dials in one direction only before taking a reading. The same procedure would apply when using my invention.

Other modifications, alterations and changes falling within the protection of the following claims may be resorted to.

I claim:
1. In combination, a machine tool having
  (a) a rotatable shaft,
  (b) first scale means having unit marks thereon and a cooperating pointer,
  (c) a direct driving connection between said shaft and said scale means for moving the scale means to indicate an integral unit distance on the scale means when the shaft moves a complete revolution,
  (d) second scale means having different unit marks from the first scale means and a cooperating pointer,
  (e) gear train means mechanically interconnecting said shaft and said second scale means, the gear ratio being such that the shaft moves a complete revolution when said second scale means moves a unit distance on the second scale means,
  (f) manual driver means for said shaft,
  (g) selectively operably coupling means between said driver means and the shaft,
  (h) said coupling means having two operative conditions
    (1) in one of said conditions coupling said driver means directly to the shaft to move the shaft in unison with motion of the driver,
    (2) in the other of said conditions coupling the driver means to said second scale means to move the shaft through said gear train with motion of the driver.

2. The invention according to claim 1, said driver means comprising a rotatable drive element loosely mounted on said shaft, said second scale means including a scale element mounted for rotation on said shaft, said scale element being coupled to said gear train, said coupling means including a movable coupling element having two positions in one of which it couples said drive element directly to said shaft and in the other of which it couples the drive element to said scale element.

3. The invention according to claim 2, said coupling means comprising a coupling pin fittable into respective pairs of coupling apertures mounted on said drive element and on said shaft, and on said drive element and said second scale element, respectively.

4. The invention according to claim 2, said first scale means including a first scale element mounted on said shaft for rotation therewith, said entire dial and gear train assembly being mounted as a unit on said shaft.

References Cited by the Examiner

UNITED STATES PATENTS

| | | | |
|---|---|---|---|
| 1,027,549 | 5/1912 | Kronert | 33—166 |
| 1,444,565 | 2/1923 | Smith | 33—166 |
| 1,639,885 | 8/1927 | Gammeter | 74—10.54 |
| 2,753,834 | 7/1956 | Bourguignon | 116—115 |
| 2,894,479 | 7/1959 | Thumin | 116—115 |
| 2,914,153 | 11/1959 | Krause et al. | 116—115 |

FOREIGN PATENTS 112,213  10/1962  Pakistan.

LOUIS J. CAPOZI, *Primary Examiner.*